United States Patent Office 3,772,424
Patented Nov. 13, 1973

3,772,424
HYDROMETALLURGICAL RECOVERY OF METAL VALUES
Laurence G. Stevens, Marilyn Miller, and Leonhard A. Goeller, Des Plaines, Ill., assignors to Universal Oil Products Company, Des Plaines, Ill.
No Drawing. Continuation-in-part of abandoned application Ser. No. 208,421, Dec. 15, 1971. This application June 2, 1972, Ser. No. 263,361
Int. Cl. C01g 53/06, 53/12
U.S. Cl. 423—144
11 Claims

ABSTRACT OF THE DISCLOSURE

In the hydrometallurgical recovery of metal values from ores and the like, the method of improving subsequent extraction with ammonium carbonate solution, which comprises effecting a reducing step by means of a reducing gas at a temperature of from about 1000° to about 1800° F. in contact with added hydrogen halide or precursor thereof. In another embodiment, both the added hydrogen halide and added sulfur are utilized in the reducing step.

CROSS-REFERENCE TO RELATED APPLICATION

This application is a continuation-in-part of copending application Ser. No. 208,421, filed Dec. 15, 1971, and now abandoned.

BACKGROUND OF THE INVENTION

In the processing of materials containing metal values two of the main extractive methods to be considered are pyrometallurgy and hydrometallurgy. In the former, metal-containing material such as ore, slag, scrap, etc., is heated with appropriate agents such as reducing agents, fluxing agents, sulfidizing agents, chloridizing agents and/or oxidizing agents, etc., usually to the melting or fusion point of the mixture. At this temperature there is generally a separation of metallic values from gangue or waste materials. The procedure then calls for separating the metallic values from slag or waste material at a temperature at which both are molten. The phase containing the metal value is then cast to some convenient shape for use or for further refining, whichever is appropriate for the particular system involved. The very high temperatures involved in this technique are achieved via electric furnaces, blast furnaces, reverberatory furnaces, etc. Temperatures required for metals such as copper, nickel, iron would generally range from 2000° F. to 3000° F. An advantage in this method is that recoveries of the metal values are typically quite high.

The hydrometallurgy approach differs substantially from pyrometallurgy in that, although the metal bearing material such as ore, slag, scrap, etc., may be heated with agents such as reducing agents, oxidizing agents, sulfatizing and chloridizing agents as part of the procedure, the temperatures involved are generally much lower than with the usual pyrometallurgical method. These temperatures typically may be 500° F. to 1900° F., temperatures generally well below the fusion point of the metal-containing material.

Following this step, the treated metal-containing material then is contacted with an appropriate aqueous solution for extracting metal values by dissolution. The metal is then removed from the solution by precipitation, solvent extraction, evaporation of solvent, etc. The metal-containing residue obtained is then handled appropriately to further refine the metal. Although conditions of temperature are generally much lower than in pyrometallurgy, it is frequently found that recovery of the metal values is also lower than in the pyrometallurgical method.

A particular case where this is true concerns the extraction of nickel from lateritic nickel ores. The pyrometallurgical processes range from the use of an electric furnace for the direct smelting of ore to produce ferronickel through similar techniques involving the blast furnace in which an iron-nickel-sulfide matte is obtained. The extraction of nickel from the ore using this method is greater than 90%.

Of the several hydrometallurgy approaches used commercially for treating this type of ore, the practice on a highly serpentinic ore, such as at Nicaro, Cuba, involves roasting the ore in a multihearth furnace while a reducing gas, such as producer gas, passes countercurrent to the ore. Temperatures in this case range from about 900° F. to about 1350° F. Following the roasting step, the ore is cooled in the absence of air, mixed with an ammoniacal ammonium carbonate solution and vigorously agitated and aerated. This results in the dissolution of nickel and cobalt, separating them from the bulk of the ore. This solution then is treated with steam, driving off ammonia and precipitating nickel carbonate. This product then is treated further to obtain the appropriate form of nickel or used as such. In comparison to the pyrometallurgical process, however, extractions using this method have only been of the order of 70 to 80 percent.

Several other hydrometallurgy methods involve the use of procedures which include a roasting step with chlorides or sulfates but in other than reducing atmospheres, and the roasted ore is leached with an appropriate solvent such as dilute sulfuric acid. Alternatively, in certain cases the ore can be leached directly, such as with sulfuric acid solution but this is practical only when the magnesia content of the ore is low. It recently has been found that improved extraction of metal values is obtained when the reductive roast is effected in the presence of added sulfur. While this method considerably improves recovery of metal values, it still is desirable to provide other methods for effecting improved recovery of metal values, as well as means to further increase such recovery.

DESCRIPTION OF THE INVENTION

It now has been found that hydrometallurgical extraction of the metal values is improved when a reductive roast is effected in the presence of added hydrogen halide or precursor thereof. This improvement normally would not have been expected because it is conducted under conditions which do not form metal halides, in contradistinction to processes effected in contact with chlorinating agents but in the absence of reducing gases. Such a process is described in Chemical and Engineering News, May 10, 1971, pages 56–57, in which deep sea manganese nodules are reacted with hydrogen chloride to form soluble chlorides of metals which then are leached out with water and the solids filtered off. In the process of the present invention, it is not known just how the added hydrogen chloride serves to improve the subsequent extraction. One possible explanation may be that the hydrogen chloride gas under the specific conditions of reduction, in combination with the reducing gas, serves somehow to destroy the silica lattice. It is understood that applicants do not wish to be limited to this explanation. Regardless of the reasons therefor, improved extraction is obtained as will be illustrated in the appended examples.

As hereinbefore set forth, effecting the roasting of the ore in contact with the added hydrogen chloride gas improves the subsequent extraction of metal values in the leaching solution. This results in recoveries of greater than 80–90%, which high recoveries were not obtained heretofore in the hydrometallurgical system effected in the absence of added sulfur or added hydrogen halide. In addition to the improved recoveries, the process of the present invention can be effected in unusually short times. High recoveries were obtained in 30 minute roasting times, in contrast to the requirements of greater than 1 hour when the reducing treatment is effected in the absence of added sulfur or the added hydrogen chloride gas. It is understood, however, that in some cases, longer roast times can be used to advantage in the process of the present invention.

In another embodiment of the present invention, even further improved results are obtained when the reduction is effected in contact with added hydrogen halide or precursor thereof and added sulfur. The use of both of these added ingredients, in combination with conventional reducing gases, results in even greater recovery of metal values than obtained by the use of either of these added ingredients alone, apparently due to a synergistic effect. Still another important advantage to the use of added hydrogen halide gas and added sulfur, in combination with the conventional reducing gases, nickel ores containing as low as 5% by weight of iron may be processed by the hydrometallurgical method to recover high yields of metal values. Heretofore the low iron garnieritic type ores could be processed satisfactorily only in the pyrometallurgical method. As described in the article entitled "Cobalt From Nickeliferous Limonites" by P. E. Queneau and H. J. Roorda, Society of Mining Engineers, August 1971, pages 70–73, these low iron content ores either must be processed by pyrometallurgy or else left in situ. In contrast to the teachings of the prior art, such low iron content ores may be satisfactorily processed in hydrometallurgy systems.

The improved process of the present invention may be used for the recovery of metal values from ore, slag, scrap or other metal bearing sources. In the interest of brevity, it is understood that reference to ore in the present specifications and claims also includes slag, scrap, or other suitable metal bearing sources. The improved process of the present invention is particularly applicable to the recovery of nickel from such sources. However, it is understood that the process may be used for the recovery of other metal values including, for example, cobalt, copper, manganese and other metals soluble in ammoniacal ammonium carbonate solutions but not necesarily with equivalent results. In the interest of brevity, the following discussion will be directed to the recovery of nickel, with the understanding that it may be applied to the recovery of other metals as hereinbefore set forth.

As another advantage to the present invention, the process may be conducted in conventional apparatus and may utilize much of the conventional steps of prior art processes. Accordingly, the ore such as a lateritic nickel ore or other metal bearing source is prepared in a manner suitable for the process, such as finely divided or comminuted particles in a conventional way. The particles may be within a size range of from about 8 mesh to about 500 mesh or more and preferably within a range of from about 48 mesh to about 200 mesh. The particles then preferably are dried in a conventional manner to lower the moisture content of from about the usual 25% to 50% down to about 8% to 10% or less. The drying generally is effected in a rotary kiln at conventional temperatures.

The added hydrogen halide gas is used in a concentration of from about 0.01% to about 10% and preferably from about 0.1% to about 5% by weight of the ore. Any hydrogen halide gas may be used and preferably comprises hydrogen chloride gas, with hydrogen bromide gas being of the next preference. In another embodiment, the hydrogen halide gas comprises hydrogen iodide or hydrogen fluoride but not necessarily with equivalent results. The hydrogen halide may be added in any suitable manner, including direct addition of the hydrogen halide gas into the roasting zone, stripping of the hydrogen halide from a solution thereof, etc. In a particularly preferred method, the reducing gas is bubbled through an aqueous solution of the hydrogen halide and carried into the reducing zone in this manner, preferably with preheating prior to charging into the reducing zone. The solution of hydrogen halide may range from 1% to saturated (37%) or even supersaturated solution, with a solution containing from about 20% to about 30% hydrogen chloride being of particular advantage. In another embodiment, the free halogen, chlorine, bromine, iodine or fluorine may be injected directly into the roasting zone wherein, upon contact with the reducing gas, will be rapidly converted to the corresponding hydrogen halide.

In still another method, other precursors of hydrogen halide may be added to the roasting zone and therein converted to hydrogen halide. In this embodiment the precursor should not be in the form of the alkali or alkaline earth metal halide but may be in acidic or nonbasic form. Illustrative precursors include boron trichloride, boron tribromide, boron trifluoride ($BF_3$), boron bromide di-iodide ($BBrI_2$), boron dibromide iodide ($BBr_2I$), etc. Other precursors comprise carbon tetrachloride, carbon tetrabromide, carbon tetrafluoride, carbon tetraiodide, phosphorus tribromide, phosphorus pentabromide, phosphorus trichloride, phosphorus pentachloride, phosphorus trifluoride, phosphorus pentafluoride, phosphorus tri-iodide, phosphorus dibromide trichloride ($PBr_2Cl_3$), phosphorus dibromide trifluoride ($PBr_2F_3$), silicon tetrabromide, silicon tetrachloride, silicon tetrafluoride, silicon tetraiodide, etc.

In still another embodiment the precursor may comprise a hydrocarbon halide as, for example, methyl chloride, methylene chloride (dichloromethane), methyl bromide, methylene bromide, methyl fluoride, methylene fluoride, methyl iodide, methylene iodide, ethyl chloride, vinyl chloride, dichloro ethylene, ethyl bromide, vinyl bromide, dibromo ethylene, vinyl fluoride, vinyl iodide and higher molecular weight hydrocarbyl halides which generally will not contain more than about 20 carbon atoms per molecule. At the high temperatures encountered in the roasting step, the precursor will be decomposed to liberate the hydrogen halide or the halogen which soon is reduced to the hydrogen halide. It is understood that the free halogen and the other precursors are not necessarily equivalent for use in the present invention but all of them will serve to improve the recovery of metal values in the subsequent extraction step of the process. When desired, a mixture of the hydrogen halides and/or precursors may be employed.

As hereinbefore set forth, the ore particles preferably are dried prior to roasting. The dried particles then are supplied to a suitable reducing zone which, here again, may be of conventional design but modified to provide means for the introduction of the hydrogen halide or precursor thereof. As also hereinbefore set forth, the added hydrogen halide may be introduced into the reducing zone in any suitable manner. When a hydrogen halide precursor is utilized, the introduction thereof will depend upon whether the precursor is normally gaseous, normally liquid or normally solid. When the precursor is normally gaseous, it may be injected directly into the reducing zone or it may be prepared as a solution in a suitable solvent, conveniently an aqueous solution, and the reducing gases bubbled therethrough to thereby carry the precursor into the reducing zone. When the precursor is normally liquid, a similar system may be utilized or the liquid precursor may be introduced directly into the reducing zone. When the precursor is normally solid, it may be previously admixed with the ore or introduced directly into the reducing zone to therein be commingled with the ore.

In the embodiment when both a hydrogen halide or precursor thereof and sulfur is utilized, the hydrogen halide may be supplied either separately or in admixture with the sulfur to the reducing zone. The sulfur may be in solid form, including powder, flour, granules, pellets, etc. or molten or otherwise liquified sulfur, or as sulfur vapors. Advantageously, the sulfur is mixed with the ore at elevated temperature, which preferably is within the range of from about 500° to about 1200° F. and conveniently is accomplished by mixing the sulfur at the elevated temperature of the particles being withdrawn from the predrying step. The sulfur generally is utilized in a concentration of from about 0.1% to about 5% and preferably from about 0.15% to about 3% by weight of the ore. Here again, it is understood that any suitable means of introducing the sulfur into the reducing zone may be utilized.

As hereinbefore set forth, conventional reducing zones may be utilized including, for example, multiple hearth furnace, fluo-solids roaster, Herreshoff furnace, etc. The chemical reduction of the ore is effected by means of a suitable reducing gas mixture which, here again, is of the general type used in conventional processes. Any suitable reducing gas mixture may be used and preferably comprises a mixture of hydrogen, carbon monoxide, carbon dioxide and water vapor. The gas mixture may come from any suitable source, including producer gas, gases formed by the combustion of city gas, gases formed by combustion of oil, etc. The specific gas mixture will be selected to effect the desired reduction of the nickel compounds. An illustrative gas mixture comprises a $CO:CO_2$ ratio within the range of about 0.1:1 to 10:1, a $CO:H_2$ ratio of about 0.1:1 to 10:1 and a $H_2:H_2O$ vapor ratio of about 0.1:1 to 10:1, all being on a volumetric basis. In one embodiment, it is desirable to maintain the gas mixture within the ratios set forth above because an excessive concentration of one or more of the components in the gas mixture may have undesired effects such as, for example, incomplete reduction of the metal compound, excessive adsorption of the gas in the ore particles, etc. It is understood that the gas mixture may contain other components as, for example, nitrogen, when advantages appear therefor. Another illustrative gas mixture comprises hydrogen, nitrogen and water vapor. Still another gas mixture may comprise natural gas.

As hereinbefore set forth, the reduction of the metal compounds to the free metal is effected at a temperature of from about 1000° to about 1800° F. and preferably from about 1200° to about 1600° F. The low temperature utilized in the reduction avoids the objections inherent in the prior art high temperature reduction processes. Also, as hereinbefore set forth, the reduction is effected in a short time and this further constitutes another advantage to the novel method of the present invention.

For economical reasons, reuse of the hydrogen halide preferably is accomplished. Conveniently, this is effected by recycling the gases withdrawn from the reducing zone, accompanied by further heating when desired. In another embodiment the reducing gases may be suitably treated to separate the hydrogen halide, which then is recovered and reused in the process. In one method, the separation and recovery of the hydrogen halide may be effected by adsorption on a suitable solid adsorbent, followed by desorption with a suitable desorbing gas, conveniently reducing gas. In another method the hydrogen halide may be absorbed in a suitable solvent and then released therefrom in any suitable manner.

The reduced ore particles are withdrawn from the reducing zone and then processed in conventional manner for the hydrometallurgical extraction of the nickel. The effluent from the reduction zone is first cooled several hundred degrees and then is passed into one or more quench zones. In a preferred embodiment the quench liquid is the ammonium carbonate leaching solution. However, the quenching must be effected in the absence of air. In other words, oxygen or air should not contact the reduced particles until the temperature of the particles is below about 200° F. because of the possibility of oxidation of the metal to the oxide or to other oxygen containing compounds. It is understood that other suitable quenching solutions may be employed but, as hereinbefore set forth, economical advantages appear for the use of the leaching solution.

Any suitable leaching solution may be employed and preferably comprises aqueous ammonium carbonate solution containing from about 2% to about 25% and preferably from about 3% to about 15% $NH_3$ and from about 1% to about 15% and preferably from about 1.5% to about 7.5% $CO_2$. As still another advantage to the process of the present invention, the leaching solution comprises a lower concentration of $NH_3$ than generally is utilized in the prior art, thus effecting an additional economy in the present process. The leaching is effected at a temperature below 200° F. and conveniently ambient temperature. Ambient pressure or superatmospheric pressure may be used but generally will not exceed about 100 p.s.i.g. As hereinbefore set forth, the leaching is effected in the presence of oxygen, which may comprise ambient air when the leaching is effected in open tanks or vessels or it may comprise air introduced into closed zones. It is understood that, in the place of air, oxygen or other suitable oxygen containing source may be utilized.

As hereinbefore set forth, the reduction in the presence of the hydrogen halide and also in the presence of both the hydrogen halide and sulfur facilitate extraction of the nickel, and particularly separation thereof from iron or iron compounds. Also, it appears that the hydrogen halide or the mixture of hydrogen halide and sulfur help in the separation of nickel from cobalt in the leaching solution. The extraction is effected in any suitable manner, and generally by passing the ore counter-currently to the leaching solution in a plurality of reaching and thickening zones.

The solution of nickel withdrawn from the leaching and thickening zones is then treated in any suitable manner to precipitate the nickel and to recover the same. In one method, this is accomplished by steaming to precipitate the nickel carbonate and to volatilize off ammonia, $CO_2$ and water. As hereinbefore set forth, the use of the hydrogen halide permits recoveries of nickel greater than 85%, in contrast to the recoveries of less than 50–70% normally obtained when the chemical reduction is effected in the absence of the hydrogen halide. Even greater recoveries are obtained when both the hydrogen halide and sulfur are utilized. Still further, low iron content ores may be treated economically to recover nickel therefrom, in contrast to the former requirement of using the higher temperature pyrometallurgical process or in not being able to effect such recovery economically.

The following examples are introduced to illustrate further the novelty and utility of the present invention but not with the intention of unduly limiting the same.

Example I

A series of experimental runs was made in the following manner. These runs were made with a Philippine lateritic nickel ore having the following assay:

TABLE I

| | Percent |
|---|---|
| Ni | 1.38 |
| Fe | 15.4 |
| MgO | 11.0 |
| $SiO_2$ | 38.0 |

In each run, 25 grams of the ore were weighed into a tared ⅞" I.D. quartz combustion tube, purged with reducing gas to eliminate any oxygen which may have been contained in the tube, and then placed into a split tube furnace at a temperature of 900° F. A reducing gas was passed over the sample, while the temperature was increased to 1500° F. over a period of 30 minutes. The gas composition was as follows:

TABLE II

| Gas: | C.f.m. |
|---|---|
| CO | .0125 |
| $H_2$ | .0125 |
| $N_2$ | .05 |
| $CO_2$ | .025 |
| $H_2O$ | [1] 3.5 |

[1] Grams.

In the control run, made without added hydrogen halide, the reducing gas was passed through a bubbler to add water vapor and then charged directly into the combustion tube. In the runs made with hydrogen chloride, the reducing gas was bubbled through a constant boiling solution (23%) of aqueous hydrogen chloride prior to being charged to the combustion tube. The reducing gas stream is charged at a rate of about 0.08 c.f.m. The added hydrogen chloride is in an amount of about 4% by weight of the ore. It is estimated that from about 0.7 to about 1 g. of HCl is charged to the system in this manner.

When the temperature in the reducing zone reached 1500° F., the gas mixture was replaced by a flow of only $CO_2$ diluted with nitrogen, and the tube cooled to room temperature. The reduced ore then was weighed, transferred in a nitrogen atmosphere and slurried with 200 mls. of an ammoniacal ammonium carbonate solution. The slurry was agitated vigorously at ambient temperature for 2½ hours and filtered. The filtrate then was assayed for nickel content to determine the percent extraction.

In the series of evaluations conducted in the above manner, a control run was made without added hydrogen chloride. In other runs, the reducing gas was first bubbled through the aqueous hydrogen chloride solution before entering the combustion tube. The results of these runs are reported in the following table:

TABLE III

| HCl: | Percent Ni extraction |
|---|---|
| No | 48.6 |
| Yes | 73.5 |

It will be noted that the addition of hydrogen chloride increased the extraction of nickel from 48.6% to 73.5% by weight of nickel originally present in ore.

Example II

As hereinbefore set forth, even further improvement is obtained when both the hydrogen chloride and sulfur are added to the reducing step. The following table reports the results of evaluations made in the same manner as described in Example I, with the same ore, but using both hydrogen chloride and sulfur. The sulfur powder was physically mixed with the ore particles at room temperature prior to the reducing treatment. For comparison purposes, a run made with only added sulfur but not hydrogen chloride also is included in the following table.

TABLE IV

| HCl | Sulfur, percent | Percent Ni extraction |
|---|---|---|
| No | 1 | 86.2 |
| Yes | 1 | 98.1 |

It will be noted that the addition of sulfur increased the recovery to 86.2%. However, the addition of both the HCl and the sulfur increased the recovery to over 98%. As hereinbefore set forth, this exceptionally high recovery apparently is due to a synergistic effect between the hydrogen chloride and sulfur in contact with the reducing gas.

Example III

A similar series of evaluations was made on a different Philippine lateritic nickel ore sample which had an iron content of less than 5%. This ore sample had the following assay:

TABLE V

| | Percent |
|---|---|
| Ni | 1.66 |
| Fe | 4.9 |
| MgO | 33.4 |
| $SiO_2$ | 27.9 |

As hereinbefore set forth, such ores normally must be treated by a pyrometallurigical method to recover the nickel or even may not be economically feasible to attempt recovery of the nickel. However, when this ore was treated in accordance with the present invention, in the same manner as described in Example I but using both the HCl and 1% by weight sulfur, a recovery of 84.3% by weight nickel was obtained. In a control run not using either of these additives, only 24.4% nickel was recovered. When the reduction was effected using both the hydrogen chloride and sulfur for 90 minutes instead of the previous run for 30 minutes, the nickel recovery amounted to 88.1%.

Example IV

Another series of runs was made using a different ore which is believed to be a composite of samples which were thought suitable only for pyrometallurgical processing. This ore had the following assay:

TABLE VI

| | Percent |
|---|---|
| Ni | 1.55 |
| Fe | 8.5 |
| MgO | 29.0 |
| $SiO_2$ | 42.7 |

These runs were made in the same manner as described in Example I. The results of these runs are reported in the following table:

TABLE VII

| HCl | Sulfur | Percent Ni extraction |
|---|---|---|
| No | No | 64.8 |
| Yes | No | 87.4 |
| No | 1% | 84.3 |
| Yes | 1% | 90.8 |

From the above data, it will be noted that the HCl or sulfur alone considerably improved the recovery of nickel, However, the use of both the HCl and sulfur increased the recovery of nickel to over 90%.

Example V

The hydrogen halide used in this example is hydrogen bromide. These runs were made in substantially the same manner as described in the previous examples, using an ore of the following assay:

TABLE VIII

| | Percent |
|---|---|
| Ni | 1.45 |
| Fe | 7.2 |
| MgO | 25.9 |
| $SiO_2$ | 36.8 |

When the reduction was effected in the absence of added hydrogen halide or added sulfur, the recovery of nickel amounted to 35.8%. However, when the reducing treatment was effected in the presence of hydrogen bromide, the recovery of nickel was increased to 53.8%. When using both the added hydrogen bromide and 1% sulfur, the nickel recovery was increased to 82.4%.

Example VI

Still another series of evaluations was made in substantially the same manner as described in Example V, using an ore containing 2.90% nickel and 4.7% iron. Here again, it will be noted that this low iron content ore normally would require high temperature pyrometallurgy to recover the nickel. However, when the hydrometallurgical method described in the previous examples was used, only 16.5% nickel was recovered in the absence of the added hydrogen halide and sulfur. However, when the reducing treatment was effected in contact with added hydrogen bromide and 1% by weight sulfur, the nickel recovery was 75.1%.

Example VII

A sample of oxidized copper ore having a copper content of 1.16% by weight was leached in an ammoniacal solution under oxidizing conditions with agitation for a period of 2.5 hours, with the copper being extracted from the ore to the extent of about 45% by weight. However, when the ore is subjected to a roasting treatment as herein described with reducing gases and added hydrogen chloride, extraction with the ammoniacal solution will result in extraction of the copper to an extent in excess of 88% by weight.

Example VIII

Slag from copper melting furnace is subjected to a reductive roast in contact with reducing gases and added hydrogen chloride at a temperature of about 1350° F. for about 20 minutes. The slag is partly cooled and slurried with ammoniacal leach solution under oxidizing conditions for 2.5 hours. Visual observation of the deep blue color confirms the improved extraction of the copper from the slag.

We claim as our invention:

1. A method of recovering nickel from a nickel bearing source which comprises subjecting said nickel bearing source to a reducing treatment with a reducing gas at a temperature of from about 1000° to about 1800° F. and in contact with added hydrogen halide in a concentration of from about 0.01% to about 10% by weight of said nickel bearing source or precursor thereof, and then extracting nickel from the thus reduced material with ammonium carbonate solution.

2. The method of claim 1 in which said hydrogen halide is hydrogen chloride.

3. The method of claim 2 in which said hydrogen chloride is supplied to said reducing treatment by first bubbling said reducing gas through an aqueous solution of hydrogen chloride.

4. The method of claim 1 in which said hydrogen halide is hydrogen bromide.

5. The method of claim 1 in which said reducing treatment is effected in contact with said hydrogen halide and added sulfur.

6. The method of claim 5 in which said added sulfur is in a concentration of from about 0.1% to about 5% by weight of said source.

7. The method of claim 1 in which said nickel bearing source comprises nickel bearing ore.

8. The method of claim 7 in which said hydrogen halide is hydrogen chloride in a concentration of from about 0.1% to about 5% by weight of said ore.

9. The method of claim 1 in which said reducing treatment is effected for a time of less than one hour at said reducing temperature.

10. The method of claim 1 in which the ammonium carbonate solution comprises aqueous ammonium carbonate solution containing from about 2% to about 25% $NH_3$ and from about 1% to about 15% $CO_2$.

11. The method of claim 10 in which said solution contains from about 3% to about 15% $NH_3$ and from about 1.5% to about 7.5% $CO_2$.

References Cited

UNITED STATES PATENTS

| | | | |
|---|---|---|---|
| 3,232,750 | 2/1966 | Wesolowski et al. | 75—103 X |
| 2,478,942 | 8/1949 | Queneau et al. | 75—103 X |
| 3,100,700 | 8/1963 | Hills | 75—103 X |
| 3,453,101 | 7/1969 | Takahashi et al. | 75—119 X |

FOREIGN PATENTS

| | | | |
|---|---|---|---|
| 765,348 | 8/1967 | Canada | 75—103 |

HERBERT T. CARTER, Primary Examiner

U.S. Cl. X.R.

423—143, 150; 75—103, 119